Figure 23:
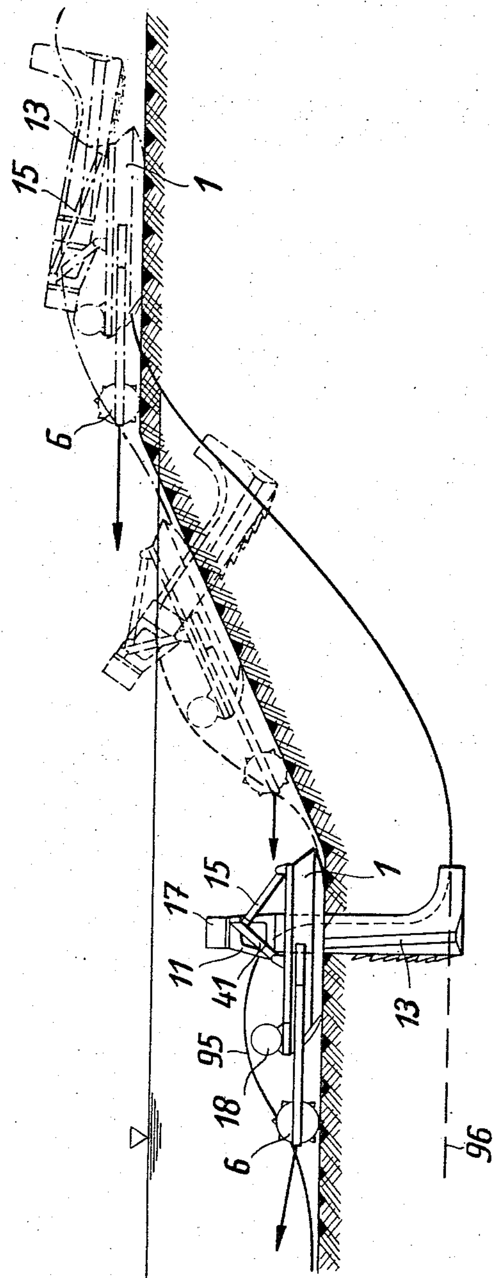

Aug. 29, 1967 R. HARMSTORF 3,338,060
ARRANGEMENT TO BED FLEXIBLE LINES IN THE GROUND UNDER WATER
Filed Oct. 26, 1964 16 Sheets-Sheet 1
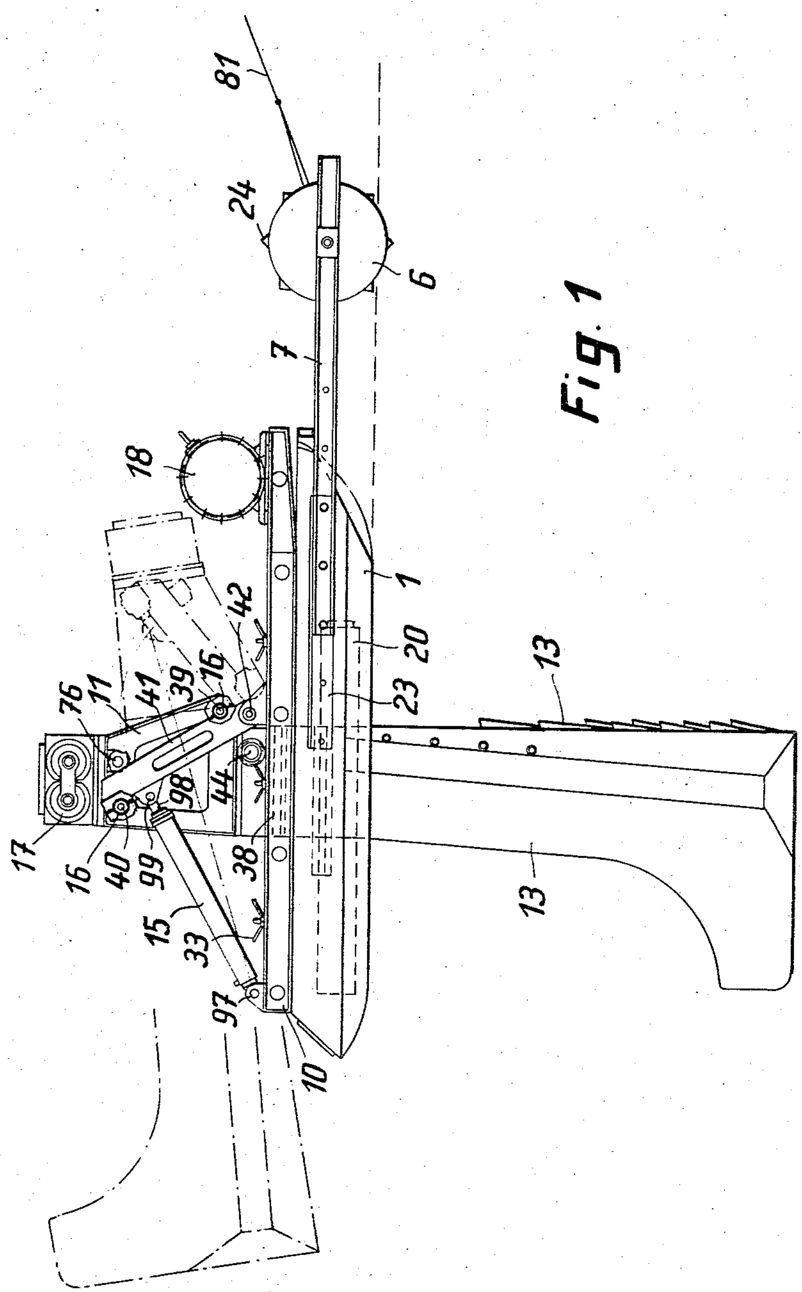
INVENTOR.
Rudolf Harmstorf
BY
Beaman & Beaman
attys

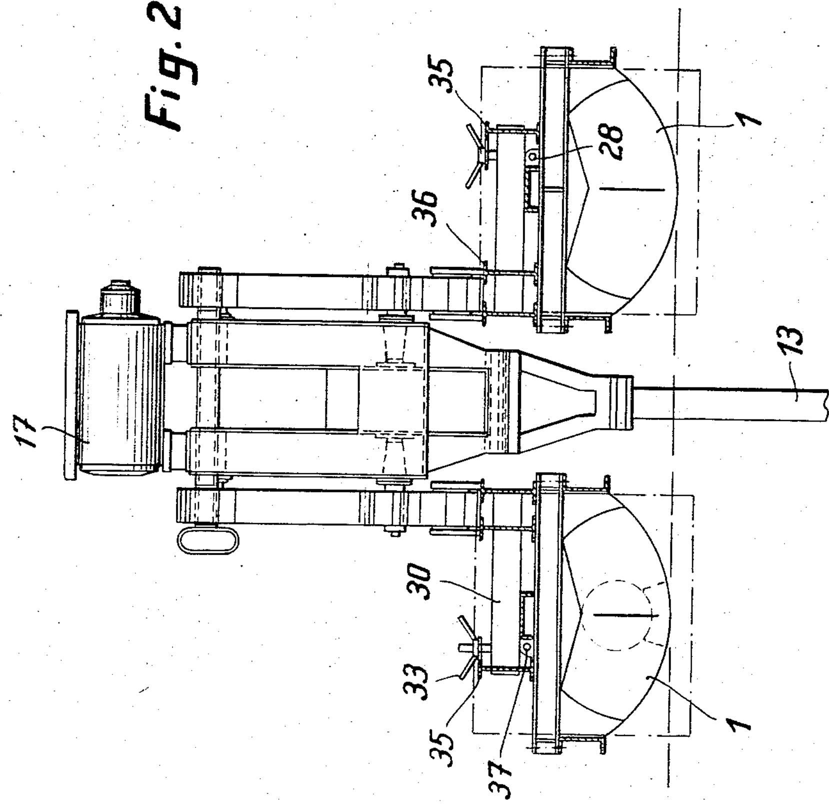
INVENTOR.
Rudolf Harmstorf
BY
Beaman & Beaman
attys

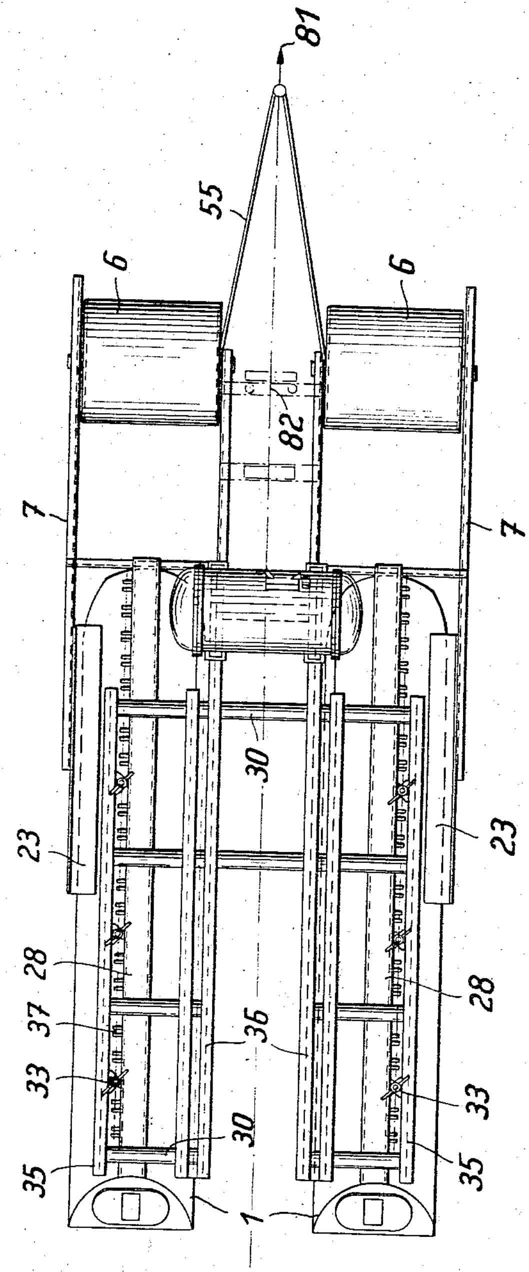
INVENTOR.
Rudolf Harmstorf
BY
Beaman & Beaman
attys

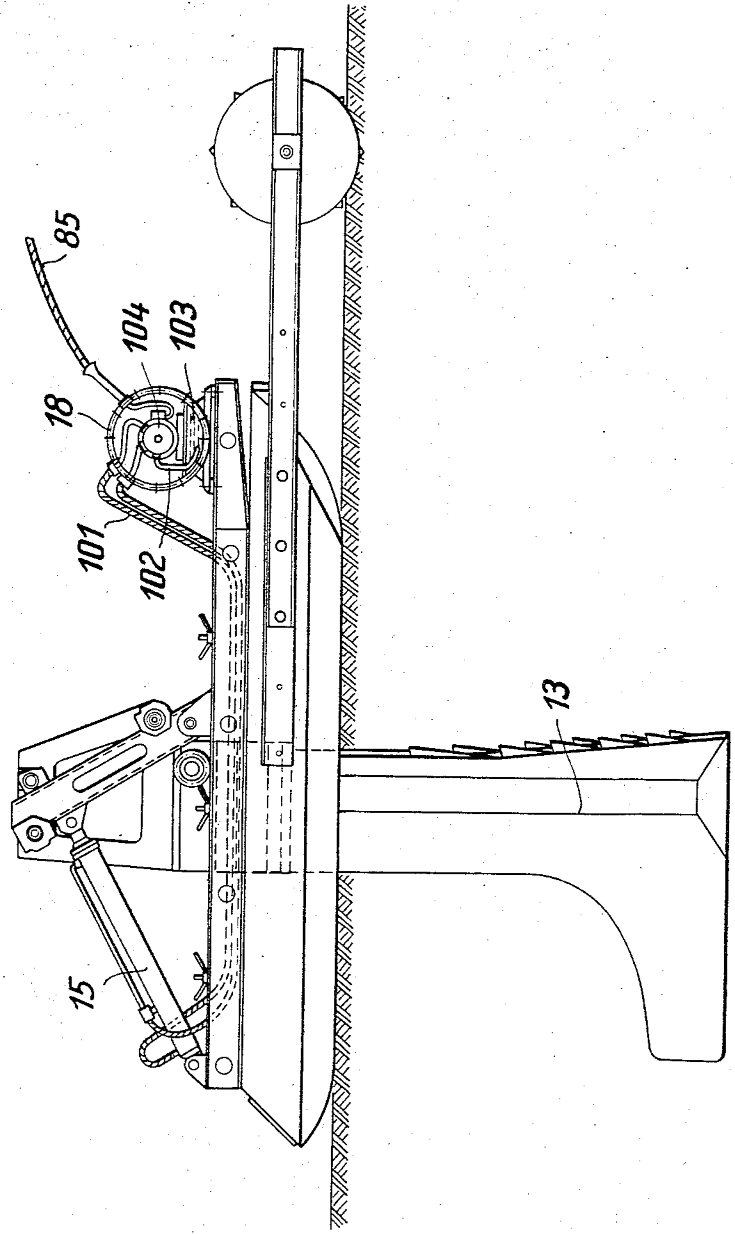
INVENTOR.
Rudolf Harmstorf
BY
Beaman & Beaman
attys

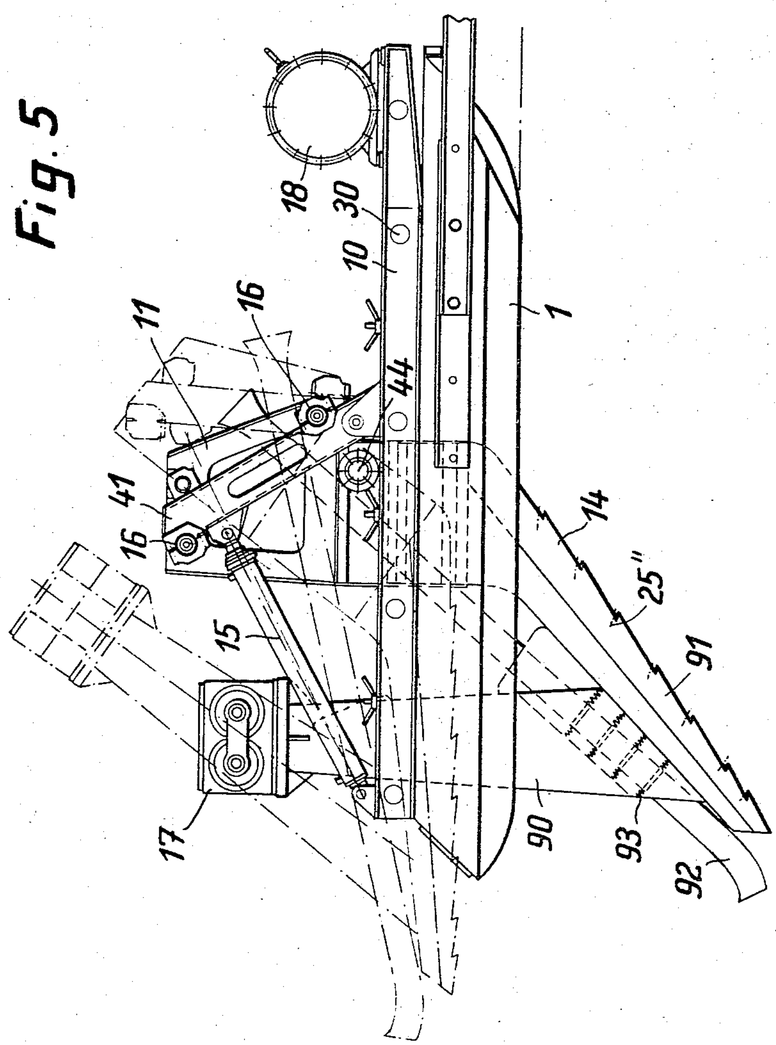
INVENTOR.
Rudolf Harmstorf
BY
Beaman & Beaman
attys

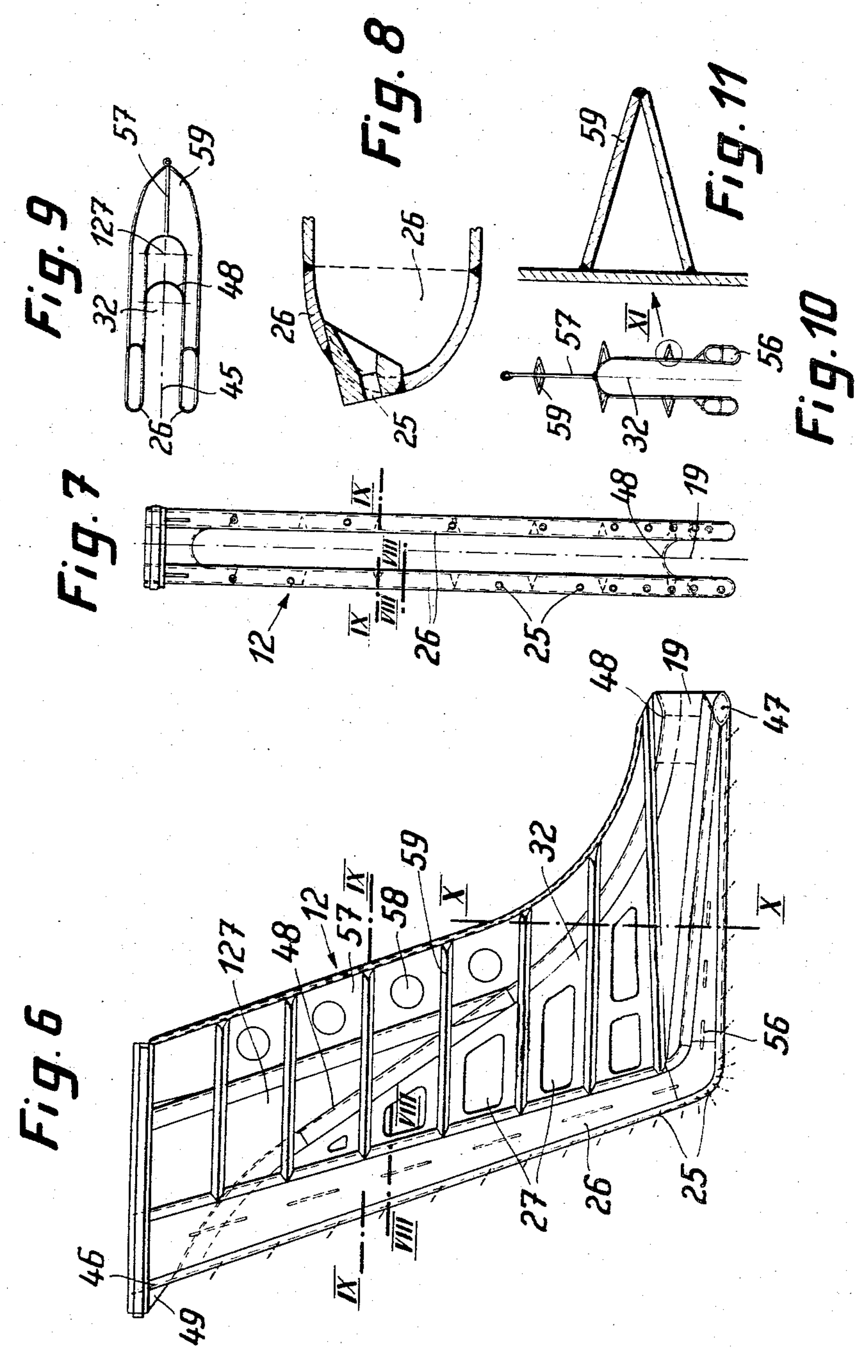
INVENTOR.
Rudolf Harmstorf
BY
Beaman & Beaman
attys

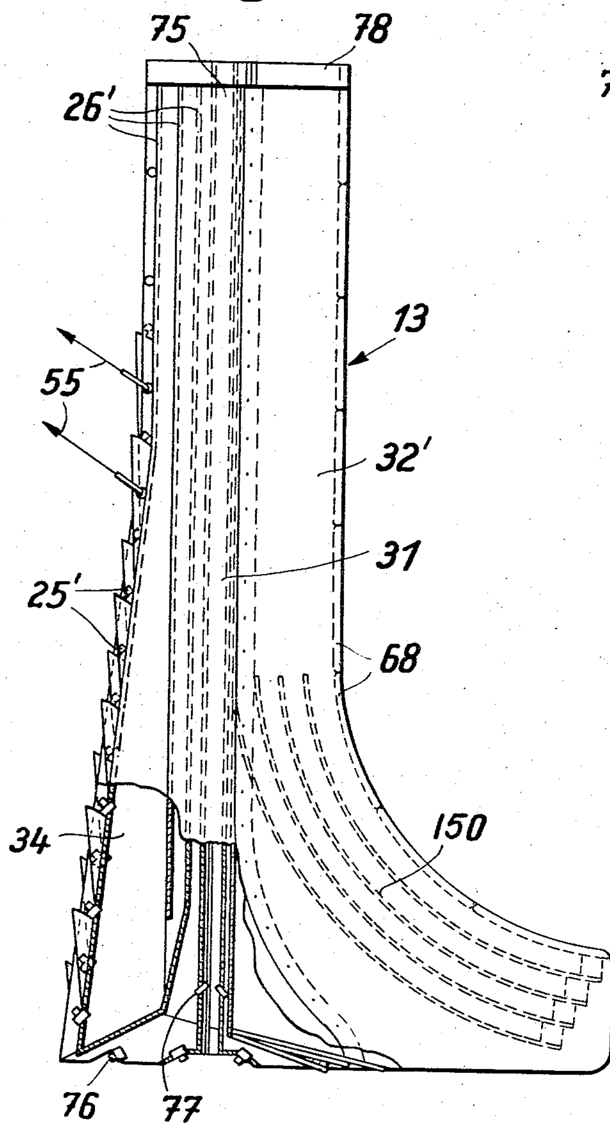
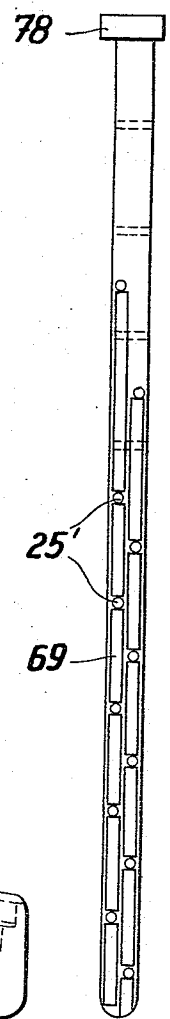
INVENTOR.
Rudolf Harmstorf
BY
Beaman & Beaman
attys

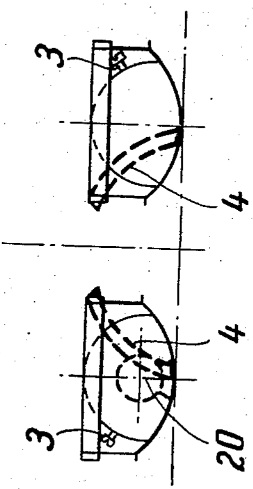
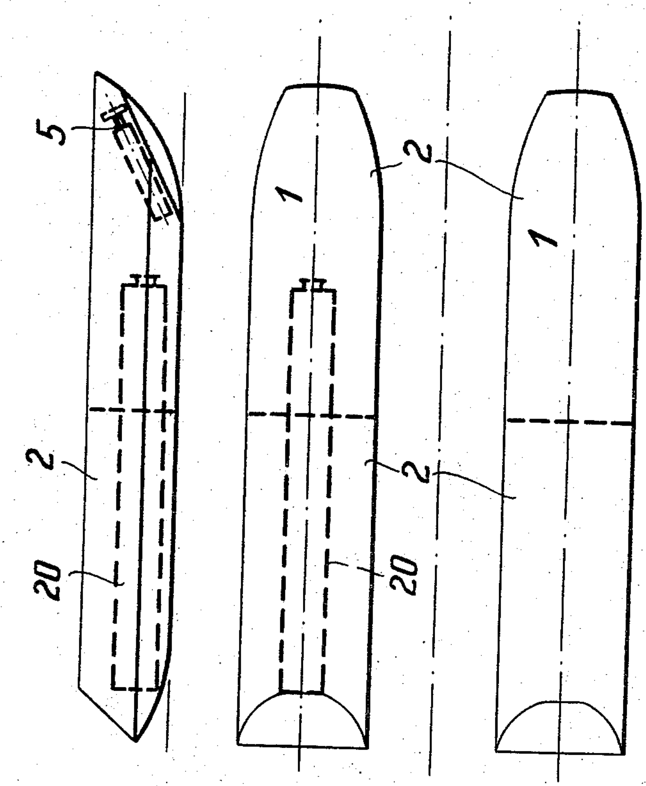
INVENTOR.
Rudolf Harmstorf
BY
Beaman & Beaman
attys

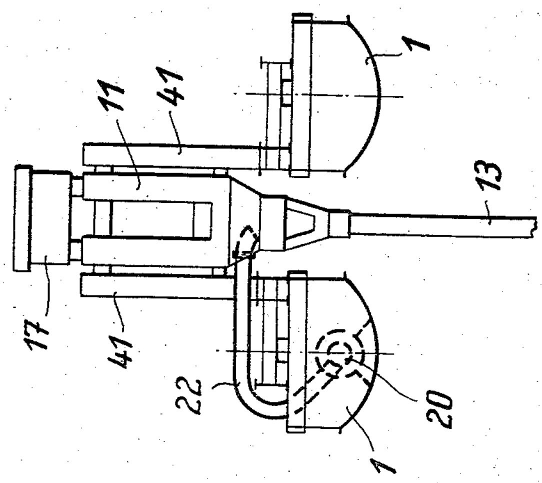
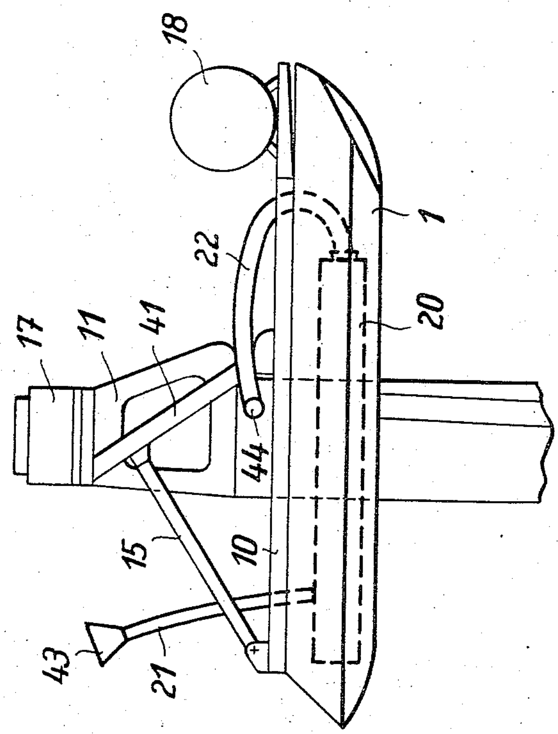
INVENTOR.
Rudolf Harmstorf
BY
Beaman & Beaman
attys

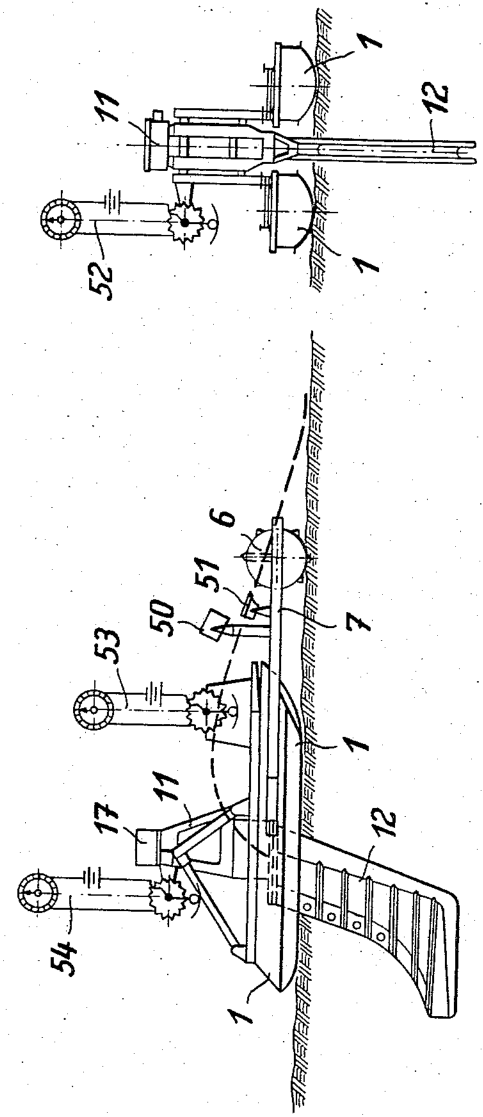
INVENTOR.
Rudolf Harmstorf
BY
Beaman & Beaman
attys

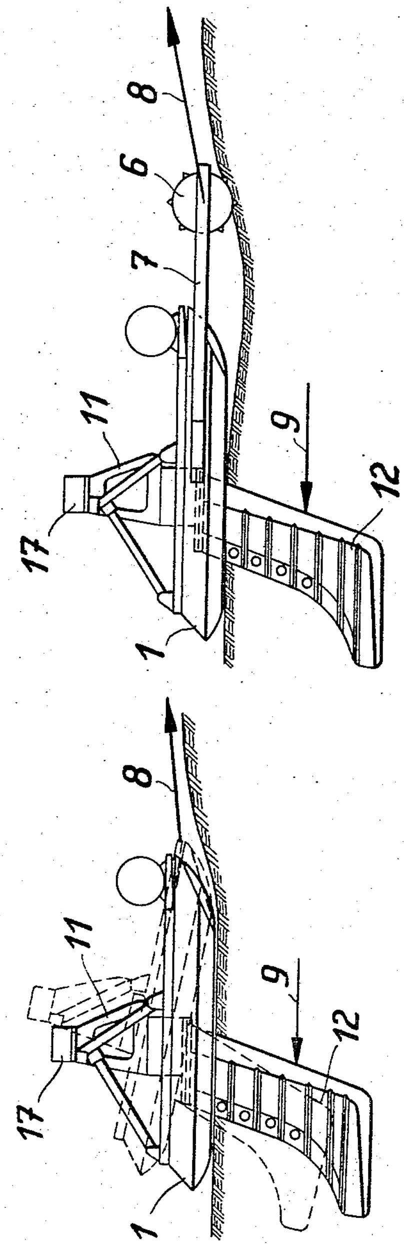
INVENTOR.
Rudolf Harmstorf
BY Beaman & Beaman
attys

INVENTOR.
Rudolf Harmstorf
BY
Beaman & Beaman
attys

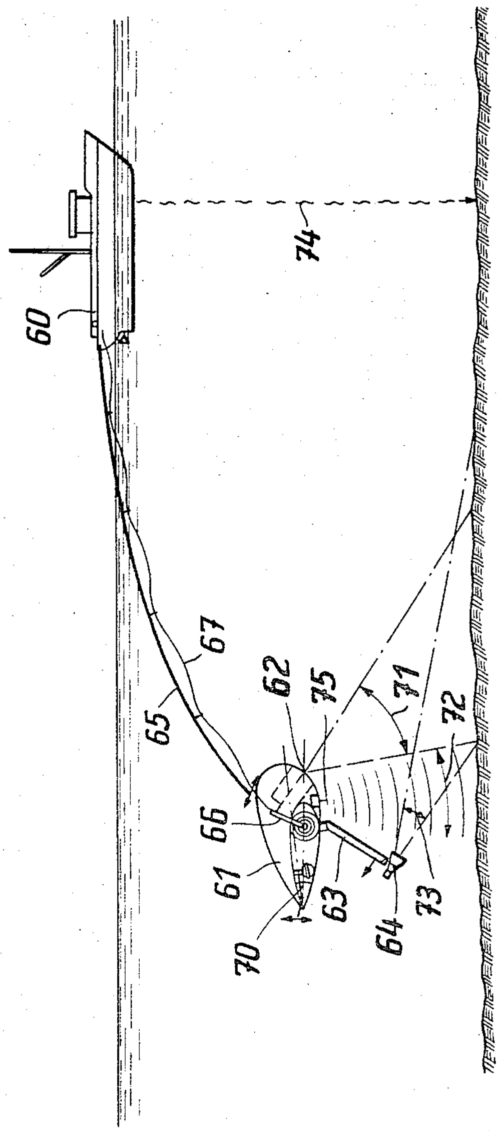
INVENTOR.
Rudolf Harmstorf
BY
Beaman & Beaman
attys

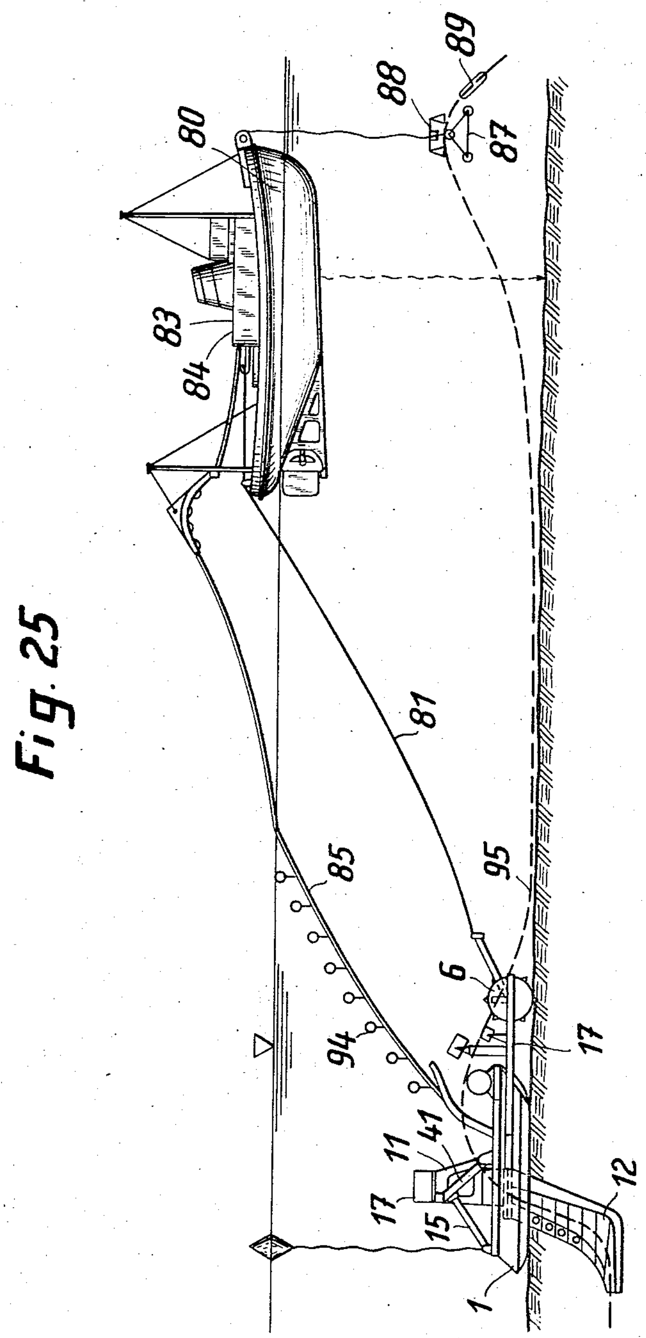
INVENTOR.
Rudolf Harmstorf
BY
Beaman & Beaman
attys

Aug. 29, 1967 R. HARMSTORF 3,338,060
ARRANGEMENT TO BED FLEXIBLE LINES IN THE GROUND UNDER WATER
Filed Oct. 26, 1964 16 Sheets-Sheet 15
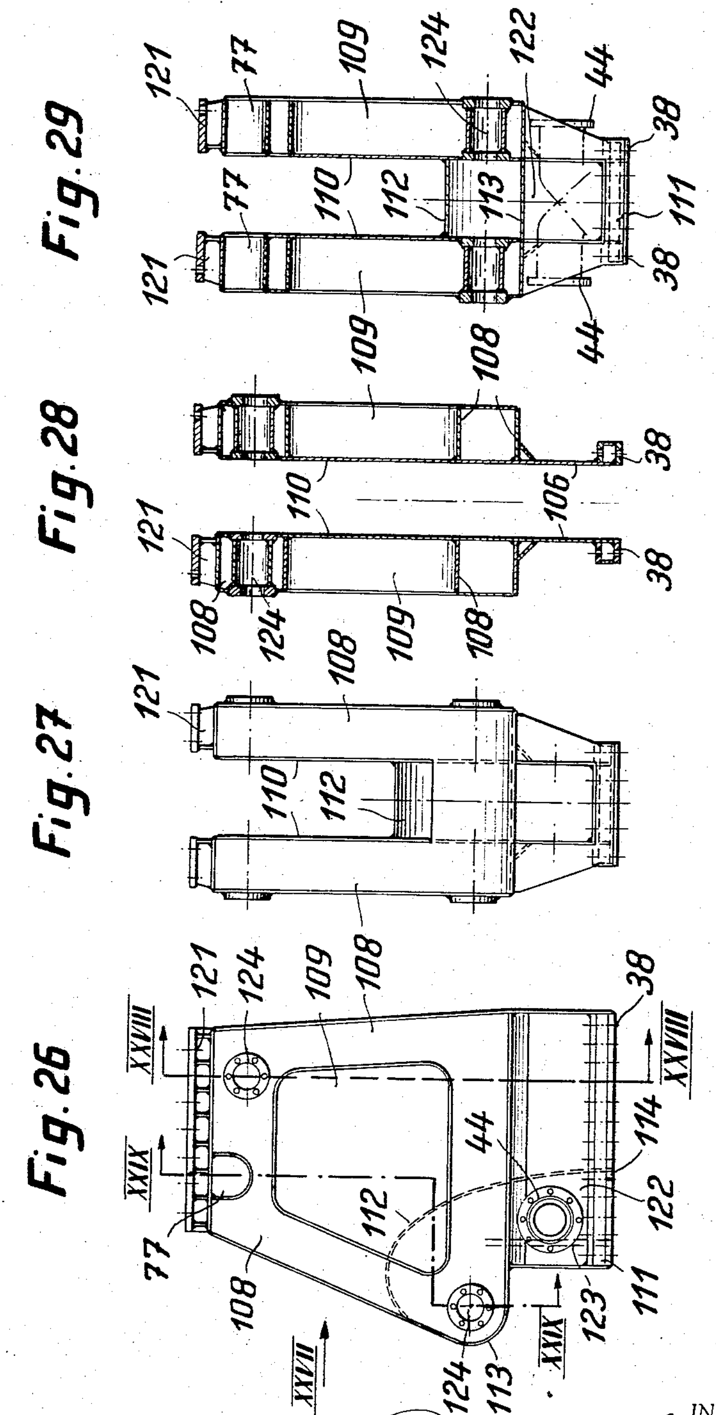
INVENTOR.
Rudolf Harmstorf
BY
Beaman & Beaman
attys Aug. 29, 1967 R. HARMSTORF 3,338,060
ARRANGEMENT TO BED FLEXIBLE LINES IN THE GROUND UNDER WATER
Filed Oct. 26, 1964 16 Sheets-Sheet 16
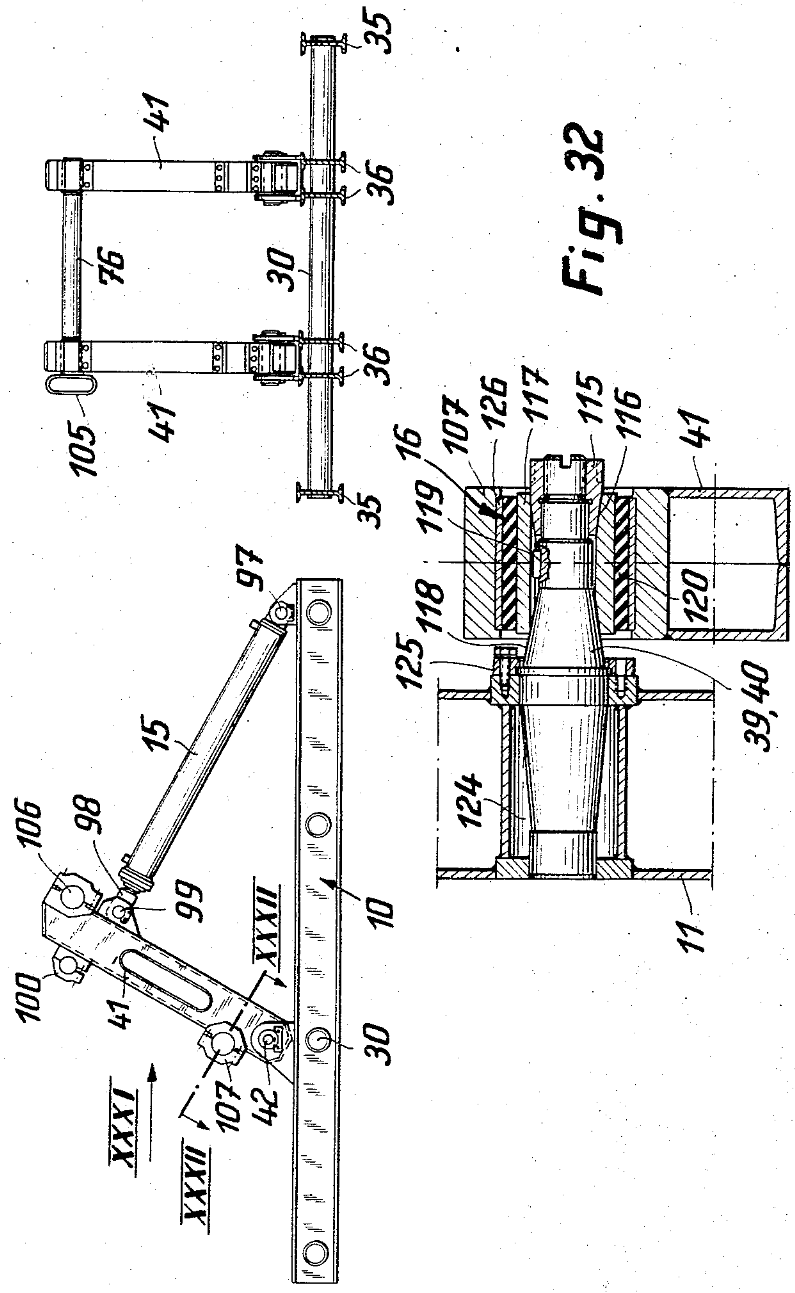
INVENTOR.
Rudolf Harmstorf
BY
Beaman & Beaman
attys United States Patent Office 3,338,060

Patented Aug. 29, 1967

3,338,060

ARRANGEMENT TO BED FLEXIBLE LINES IN THE GROUND UNDER WATER

Rudolf Harmstorf, Strandweg 99, Hamburg-Blankenese, Germany

Filed Oct. 26, 1964, Ser. No. 406,368
Claims priority, application Germany, June 18, 1964, H 52,997
16 Claims. (Cl. 61—72.4)

The invention relates to an arrangement and apparatus for flush-bedding flexible lines, especially plastic pipes, electric cables or the like underground at the bottom of waters.

With the increase of the international telephone traffic, the international sea cable network is being constantly enlarged. Also the world's ship traffic and international deep-sea fishing are constantly increasing. As both the anchors of ships and the trawling nets of fishing vessels are always causing damage to the cables when getting hold of them, these two rates of growth also lead to a corresponding increase in cable damages. Just in the last few years, cable damages have considerably increased, for instance, among the transatlantic cables at the East coast of the U.S.A. Even the heaviest armouring of cables cannot prevent damages. In this connection, consideration will have to be given also to the fact that in the development of the cable industry there is a tendency to make deep sea cables without any armouring.

The only way to prevent damages to such lines caused by outside mechanical influences is to embed such lines when laid under water, in the ground, same as is the case with overland cable laying. Many apparatuses have so far been invented to lay cables underground at the bottom of waters however, one has not succeeded as yet in developing any apparatus by which also permanent success might have been arrived at in considerable depths of water. All apparatuses which have so far been successful in operation, are applicable only in shallow waters because they must be controlled and operated mechanically from aboard a ship or pontoon. This possibility is not available with considerable depths of water because of the considerable weights which occur, the problems with strong currents and tides as well as the weather risk.

In particular, an apparatus to rinse-in flexible lines, especially plastic pipes, electric cables or the like underground at the bottom of waters has become known, which comprises a rinsing stand for the reception of at least one pipe (pressurized water pipe) leading to rinsing nozzles and at least one channel (cable channel) for the supply of at least one flexible line to the lower end of the rinsing stand, with the rinsing nozzles directed substantially forwardly in the desired direction of movement of the rinsing apparatus and the mouth of the cable channel directed rearwardly, and with the rinsing stand supported pivotally and adjustably about a horizontal plane between two floating members adapted to be rigidly interconnected, one of which serving to receive an underwater pump supplying the pressurized water. Also with this apparatus it was not possible to arrive at any permanent success when embedding such lines underground at the bottom of waters if considerable depths of water were involved.

Based on this known apparatus, the invention is devoted to the problem of providing an apparatus by means of which it is possible to lay cables and flexible pipes also in considerable depths of waters underground at the bottom of waters, especially underground at the bottom of oceans. In so doing, the cables or pipes may be laid on the bottom of oceans already before or they may also be supplied to the apparatus during the rinsing operation.

In accordance with the invention, the problem is solved in that the rinsing apparatus is fastened for replacement in a cradle which is supported between the two parts of a sledge-like, particularly floatable member for pivotal movement about a horizontal axis; in this connection the pivotal movement of the cradle and the fixing thereof in its respective position is effected with the aid of auxiliary power devices supported on the sledge-like member.

In this manner, the position of the rinsing apparatus as to depth and with it the rinsing depth may be varied at any time as required with the cradle being pivoted from its normal vertical position together with the rinsing apparatus. At the same time, the driving-in and out of the rinsing apparatus is considerably facilitated and, finally, it is possible with the aid of the invention to replace quickly and with little expense, the respective rinsing stand in use by another one. In so doing, only the flange connection between the rinsing stand and the cradle is released and another rinsing apparatus flanged to the cradle again. The pressurized water connections need not be loosened when replacing the rinsing stand because they are passing into the box-like base portion of the cradle. But it is just such a replacement of the rinsing stand that is required relatively often when rinsing-in lines at the bottom of oceans.

Suitably, the auxiliary power devices are designed as hydraulically operated cylinders with the pump, in particular, an electrically driven pump to generate the hydraulic energy being arranged on the floating member at the same time. The electrically driven servo oil pump is fitted to be tight against pressurized water in a strong-walled secured container at the front end of the carriage. The electric energy for the driving operation is fed to said pump through a cable from the ship employed in the cable laying action. The oil-hydraulic energy is supplied to the hydraulic cylinders through pipes or high-pressure resistant hoses, respectively, in the regions where a movement is taking place. However, the use of other servo forces is also possible instead of the above, for instance, also electric motors may be used which may be designed to be water-tight with a high degree of security.

In a preferred embodiment of the invention, in addition, a water-tight vibration damper to generate mechanic vibrations (vibrator) is fastened on the cradle, with vibration dampening means provided between the rinsing stand and the fastening thereof at the cradle, so that the mechanical vibrations are transferred only to the rinsing stand but not onto the floating members. For this purpose, in particular, the cradle and therewith the rinsing stand are supported on carrier levers with the aid of bearings of vibration dampening metal, on which the auxiliary power devices are effective.

The problem of the invention is furthermore solved in that in the direction of movement of the rinsing stand in front of the floating members symmetrically of their plane of symmetry which extends in the direction of movement, at least one circular cylinder roll is rotatably supported, the diameter of which is about equal to the height of the sledge-like member. Preferably, two rotatable rolls are provided with each one roll disposed in front of each of the two parts of the member. This rolling device primarily serves the purpose of reducing the pulling forces which are necessary to pull the apparatus over the bottom of the water. Owing to the resistance by which the bottom opposes the rinsing apparatus, there is a tendency of the apparatus to lift in the rearward regions thereof and to exert an increased bottom pressure in the forward range. If this increased bottom pressure were not taken up by such rolls significantly increased pulling forces would be required to pull the apparatus further over the bottom of the ocean. Such a rolling device may, if desired or required, also be arranged behind the floating members. But in so doing, care will have to be taken that the rolling device is lying rearward of the floating members a sufficient distance to clear the rinsing stand that might possibly be swung upwardly into the horizontal position. It is furthermore recommendable, in accordance with the invention, to connect each self-contained chamber of the two parts of the sledge-like members with the outside via a standpipe extending from the bottom of the chamber and terminating outwardly at a place near the upper side of the chamber. In this manner, a pressure balance between the inside of the individual chambers of the floating members and the outside automatically results.

It is furthermore recommendable to arrange for each room of the two floatable parts sledge-like to be adapted to be blown with the aid of compressed air with at least one bottle of compressed air arranged on the floatable member and, preferably, in the interior thereof. Finally, the two parts of the floatable members are each subdivided once at least in one transverse plane by means of bulkheads. It is possible in this manner to use the floatable member to trim the whole equipment.

As has already been stressed before, rinsing stands of various designs will have to be employed (to practice the invention) in dependence upon the respective conditions prevailing. A specially suitable rinsing stand to practice the invention comprises a downwardly opening center cable channel of about U-shaped cross sectional area for the supply of the lines to be laid, with each one pipe for the supply of pressurized water arranged approximately at the outer edges of said channel on either side thereof from which pipes the rinsing nozzles extend. The open rinsing stand created in this manner offers the considerable advantage that one can lift the entire apparatus from the cable at any time. This construction is employed with water depths in which it is no longer possible to avail oneself of the services of a diver and when it is intended to lift the rinsing apparatus from the cable or from the line to be laid in deep waters. These considerable advantages of the open rinsing stand are opposed by the only essential drawback that the cable channel is open towards one side, that means that the cable of the line may be endangered by foreign matter which enters the cable channel. If with difficult bottom conditions, these dangers become especially great, it is recommended in accordance with the invention to make use of a rinsing stand having both the cable channel and the pressurized water pipe arranged in a closed box which comprises only the openings for the entry and exit of the pressurized water and the lines to be laid.

With special bottoms, for instance extremely hard ones, finally, a rinsing stand is recommended which comprises a pressurized water pipe obliquely bent angularly rearwardly with a special self-contained cable channel arranged in the rear which extends likewise obliquely rearwardly. In this case, it may be recommendable to fit the water-tight vibrator by means of a special stand on the rearward lower end of the pressurized water pipe with the cable channel extended through said stand with the aid of vibration dampening bearings.

It is possible with the aid of such an apparatus to rinse-in cables and flexible lines underground at the bottom of waters even in considerable depths. To watch the individual phases of the rinsing operation in the water, especially in the bottom of the ocean, a television system with correspondingly strong spot-lights is arranged on the carriage in such a manner that one may watch all the functions of the apparatus from aboard the ship employed in the laying operation. Measuring apparatuses to control the position of the entire rinsing apparatus are additionally provided. The auxiliary power device for the cradle and the valves for trimming and blowing, respectively, the floating members are electrically actuated. All the electric cables which are leading from a ship employed in the laying operation to a rinse-in carriage, are stranded and provided with floating members spaced from one another in such a manner that the cable bundle is relieved and thus a floating condition for better handling in the water is obtained.

Further improvements and suitable developments of the subject matter of the invention will be illustrated by way of the accompanying drawing showing some embodiments of the invention in a simplified manner. In the drawings, FIG. 1 shows a side view taken on a rinsing apparatus made in accordance with the invention comprising an enclosed rinsing stand, FIG. 2 is a transverse view taken on the rinsing apparatus of FIG. 1 with a part of the rinsing stand omitted, FIG. 3 is a top plan view taken on the apparatus shown in FIGS. 1 and 2 with the cradle and the rinsing stand fastened thereto and the vibrator likewise fastened thereto omitted, FIG. 4 shows a view similar to that one shown in FIG. 1, however, including a diagrammatic representation of the electrohydraulical device to pivot the cradle and the rinsing stand fastened thereto, FIG. 5 is a side view taken on the rinsing stand made in accordance with the invention and shown in FIGS. 1–4, however, including a modification of the rinsing stand used in connection with this rinsing apparatus, FIG. 6 shows a side view taken of an open rinsing stand constituting another embodiment for the rinsing stand to be used together with the rinsing-in apparatus shown in FIGS. 1–4, FIG. 7 shows a transverse view taken on the rinsing apparatus of FIG. 6, FIG. 8 is a partial sectional view taken on the front portion of a compressed water channel of the rinsing stand of FIGS. 6–7 in accordance with the lines VIII—VIII of these figures, FIG. 9 is a sectional view taken on the line IX—IX of FIGS. 6–7, FIG. 10 is a sectional view taken on line X—X of FIG. 6, FIG. 11 is a partial sectional view of FIG. 10 corresponding to the circle XI of that figure, FIG. 12 is a partially sectional side view taken on an enclosed rinsing stand similar to the rinsing stands shown in FIGS. 1, 2 and 4, FIG. 13 is a transverse view taken on the rinsing stand of FIG. 12, FIG. 14 is a diagrammatic side view taken on a floatable part of a sledge-like member made in accordance with the invention, FIG. 15 is a top plan view taken on two cooperating floatable parts of a sledge-like member to carry out the invention, however, with the rigid interconnection of the two floatable parts omitted, FIG. 16 is a transverse view taken on the floatable parts of FIGS. 14–15, FIG. 17 is a diagrammatic side view taken on a floatable member arrangement designed in accordance with the invention including the pertaining cradle, FIG. 18 is a transverse view taken on the floatable member arrangement of FIG. 17, FIG. 19 is a diagrammatic side view taken on a rinsing apparatus made in accordance with the invention to show the measuring instruments fitted on the apparatus in a diagrammatic view, FIG. 20 is a transverse view taken on the rinsing apparatus of FIG. 19, FIG. 21 is a diagrammatic side view taken on a rinsing apparatus to show the wrong adjustment which may result without the application of part of the means provided in accordance with the invention, FIG. 22 is a diagrammatic view taken on the rinsing apparatus of FIG. 21 using means in accordance with the invention to secure a constantly irreproachable rinsing position, FIG. 23 is a diagrammatic representation to show the employment of a rinsing apparatus designed in accordance with the invention from the bank of the water, FIG. 24 is a diagrammatic view to show the measure to investigate the line which is to be rinsed-in by the arrangement in accordance with the invention, FIG. 25 is a diagrammatic representation to illustrate the mode of operation in cases where the rinsing apparatus is towed by a trawler and the line or cable to be rinsed-in is already lying at the bottom of the body of water, FIG. 26 is a side view taken on a cradle formed in accordance with the invention, FIG. 27 is a transverse view taken on the cradle of FIG. 26 in the direction of the arrow XVII of FIG. 26, FIG. 28 is a section taken on line XXVIII of FIG. 26, FIG. 29 is a section taken on line XXIX of FIG. 26, FIG. 30 is a side view taken on a carrier lever construction made in accordance with the invention to hold and pivot the cradle, FIG. 31 is a view taken on the construction of FIG. 30 in the direction of the arrow XXXI, and FIG. 32 is a partial sectional view taken on line XXXII—XXXII of FIG. 30, however, with the addition of the pertaining part of the cradle.

The position of the parts of the FIGS. 26–31 is shown in an mirror image with respect to the position of these parts in the FIGS. 1–5 while the direction of movement of the carriage in FIGS. 1–5 is from left to right in the plane of the drawing, the movement of the carriage in the plane of the drawing of the FIGS. 26 and 30 is from right to left.

The rinsing and laying apporatus proper is supported on a carriage type sledge-like or sled member which is pulled over the bottom of the water or the ocean, and which is composed essentially of two almost round pontoons 1. These two pontoons 1 are formed in such a manner that they may serve as a floatable member for the entire apparatus. These two parts 1 of the sledge-like or floatable members are—as will be seen from FIGS. 14 and 15—subdivided into several water-tight compartments or rooms 2 which may be used alternately as trimming cells. Each trimming cell 2 is provided with a compressed air connection 3, which is in communication with a compressed air bottle 5 in a manner not shown in more detail. In addition, there is arranged in each trimming cell 2 an open standpipe 4 emanating approximately from the bottom of the cell and opening into the open at the top edge thereof.

As shown in FIG. 14, a compressed air bottle is suitably arranged in each part 1 of the floatable member. However, it is also possible to arrange, for instance, one common compressed air bottle instead in any place on the bottom of the parts of the floatable members. It is thus made possible to alternately blow and flood each cell 2. The open standpipe additionally serves the purpose of automatically effecting a pressure balance between the outer and inner pressure with increasing or decreasing depth of water. The control of the compressed air valves and the flooding valve (not shown) is effected electrically via a cable from the ship employed in the laying operation.

In front of these pontoons 1 which are composed to form a sledge-like carriage, two rolls 6 are rotatably supported on carriers 7 as will be seen from FIGS. 1, 3 and 4. These carriers 7 are supported for longitudinal displacement on both sides of the pontoon 1 so that they may be fixed in the positions as desired. For this purpose fastening rails 23 are arranged on both outside surfaces of the pontoons 1, said fastening rails cooperating with the carriers 7 for the rolls 6. It is therefore possible to stop the rolls 6 short of the pontoon 1 or some meters in front thereof. These rolls 6 serve the function of preventing the carriage from running fast in relatively soft soils or in uneven soils by its front end, i.e. from more or less boring its front end or more into the soil. In addition, the rolls 6 are intended to prevent the formation of a sludge pile in front of the carriage during the forward movement of the rinsing apparatus in the case of very soft or muddy soils. The essential purpose of these rolls 6, however, resides in a reduction of the pulling forces 8 (see in this connection FIGS. 21 and 22) between the ship employed in the laying operation and the rinsing apparatus. Because of the ground resistance 9 (FIGS. 21 and 22) which opposes the rinsing apparatus, the apparatus acquires a tendency of lifting in the rearward region and exerting a stronger pressure on the bottom in its forward region. In such a case (see the dotted line position of the rinsing apparatus of FIG. 21), the pontoons in the rearward region are lifting from the bottom of the ocean or other waters and the entire weight of the apparatus rests on the front end of the floating member 1. In case the floating members are not designed in accordance with the invention i.e. to include the rolls, the front end thereof would more or less dig into the ground of the ocean and the pulling forces required to pull the apparatus further over the bottom of the ocean would increase considerably. As is shown in FIG. 22, the rotatable rolls 6 prevent such disadvantageous adjustment of the apparatus. The surface of the rollers may, under certain circumstances, be provided with projections or mines 24 in order to increase the friction with respect to the bottom of the ocean.

As will be seen from FIGS. 1 and 4, the rolls have a diameter such that they penetrate slightly into the ground when the floatable member 1 is laying flat on the ground. The change of the position of the rolls in the longitudinal direction may also be effected in such a manner that a plurality of bearing points spaced from one another and intended to receive the rolls 6 are provided on the longitudinal carrier 7 which is rigidly, and not adjustably connected with the floating members 1.

The rolls 6 are provided in the form of sheet metal drums which are not filled with water in order to oppose the tendency of undercutting the bottom of the water or the ocean. While the two rolls 6 are arranged in front of the two pontoons 1 by the two carriers 7, these two pontoons are interconnected by a stable U-shaped box frame 10. This box frame has about the same length as the two pontoons. The box frame 10 is fastened on both pontoons 1 in a manner to be longitudinally adjustable. For this purpose, each one U-shaped profile 28 (FIG. 2) is fastened on the top surface of the two pontoons, onto which tubular transverse carriers 30 of the frame may be pressed with the aid of screw connections 33. A part of these tubular carriers 30 respectively connects one outer profile 35 of the frame 10 with two inner profiles 36. In the front part of the box frame 10, the transverse carriers 30 (see FIG. 3) extend beyond the two pontoons 1 and connect them rigidly with one another. The nuts of the screw connection 33 are abutting the upper surface of the outer carriers 35 with the screws themselves being pivotally supported in corresponding bearing points 37 arranged along the U-profiles 28.

A cradle 11 that may be rotated through about 90° is supported about in the center of this frame 10 (see FIGS. 1, 2, 4 and 5), said cradle consisting essentially of a rigid box-like steel construction having flanges 38 provided at the undersides thereof by means of which the respectively required rinsing stand 12, 13, 14 may be fastened. A description of the rinsing stands will be given below with the aid of FIGS. 5–13. Two bearing studs 39 and 40 spaced from one another project from the lateral planes of the cradle 11 about perpendicularly with respect to the direction of movement of the carriage and are fastened on the one hand in the cradle 11 in a manner to be described later on and are tightly clamped each into a respective pivotal lever 41 on the other hand.

These two pivotal levers 41 are (see also FIGS. 30 and 31) pivotally supported on both sides of the frame 10 each about a respective bearing point 42. The pertaining bearing trestle is supported by the inner beams 36 of the frame 10. A double-acting hydraulic cylinder 15 serves to carry out this swinging and rotatable movement of the carrier levers 41, the cylinder of which is pivotally engaging via a bearing point 97 at the frame 10 or its center beams 36 while one ear 98 of the piston rod thereof is pivotally engaged at the carrier lever 41 via a bearing point 99.

The two carrier levers 41 may be interconnected with the aid of an anchoring journal or bolt 76. For this purpose, bearing trestles 100 are provided at the carrier levers 41, which permit a clamping tight of the anchoring bolt 76 after insertion of said bolt into the bearing bore. After loosening the clamping screws (not shown) the anchoring bolt 76 may be easily removed; for this purpose, the anchoring bolt is connected with a handle 105.

At the carrier levers 41, there is provided a bearing 106 to receive each of the bearing bolts 40 of the cradle while, for the reception of the bearing bolts 39 each bearing 107 is arranged at the carrier levers. The bearings 107 are arranged on that side of the carrier levers 41 facing forwardly in the direction of movement of the carriage, and the bearings 106 are arranged on that side of the carrier levers 41 facing rearwardly in the direction of movement of the carriage. For the rest, the bearings 106, 107 are alike.

In the following, the construction of the cradle 11 will be illustrated in more detail by way of the FIGS. 26–29. The cradle consists essentially of two enclosed profile boxes 108 extending circumferentially each around a recess 109, said profile boxes being closed on their opposing sides by a sheet metal wall 110 extending downwardly beyond the profile box and bridging also the recess 109. Fange constructions 121 are arranged on the upper side of these two profile boxes 108, with a vibrator 17 (FIGS. 1, 2) adapted to be fastened to said flange constructions, said vibrator stiffening at the same time the upper parts of the two profile boxes 108 with respect to each other. If it is intended to work continuously without the vibrator or the vibrator is to be fitted in another place, the flange constructions 121 may also be omitted (see FIGS. 4 and 5).

The lower edges of the two sheet metal walls 110 are provided each with a double flange 38; the two double flanges 38 being interconnected on that side thereof facing in the direction of movement of the carriage by means of a double flange 111. The double flange 111 forms together with the flanges 38 a shape of U-shaped configuration in plan view and serves to fasten the respectively desired rinsing stands 12, 13, 14.

A transversely extending interconnecting profile box is provided for the connection of the two profile boxes 108 of the profile carrier of the cradle 11, consisting essentially of the upper sheet metal web 112 and the lower sheet metal web 113. The vaulted upper sheet metal web 112 extends downwardly as far as to the plane of the flanges 38, 111 and terminates there likewise in a flange 114 interconnecting the two flanges 38. The flanges 38, 111 and 114 enclose the downwardly opening area of a room 122 which is enclosed upwardly by the lower sheet metal web 113; and is enclosed laterally by the sheet metal walls 110; rearwardly by the upper sheet metal web 112; and forwardly by a sheet metal wall 123 extending from the double flange 111 between sheet metal walls 110 as far as beyond the lower sheet metal web 113. Two downwardly opening connections 44 are engaging at the sheet metal walls 110; via these connections, pressurized water is supplied to the room 122 and therewith to the pressurized water channels of the respective rinsing stand 12, 13, 14 flanged to the flanges 38, 111, 114.

The journal 76 (see FIG. 31 and FIGS. 1–2) is adapted to be removed for the insertion of the cable when using closed rinsing stands 13, 14 (see the specification hereinafter with the aid of FIGS. 5 and 12–13). This journal serves the purpose of rigidly interconnecting the carrier levers 41 during the laying operation. In the upper portion of the cradle, there are clearances 77 of sufficient size so that the cradle 11 with the rinsing stand 12, 13, 14 flanged thereto may freely swing as soon as these parts have been ejected by the vibrator 17 to perform oscillations, so that the soil may be loosened by the rinsing stand.

Means are provided to avoid transition of these oscillations into the frame 10 and thus into the floating members, as is shown in FIG. 32 in more detail.

Recesses 124 are provided in the cradle for the journals 39 and 40 (FIGS. 26–29). In these recesses, bolts, 39, 40 are fastened with the aid of flanges 125 securing at the same time the axial position of the bolts. The bearing studs extending in this manner from both side plates of the cradle are elastically clamped in vibration absorbing metal bushes 16 within the bearing places 106, 107 of the carrier levers 41. For this purpose, a screw 115 is screwed onto the bearing bolts 39, 40 which is effective on the inner bushing 117 of the bushing 16 made of vibration absorbing metal by means of a cone 116, said bushing 16 abutting against a cone 118 of the bearing bolt 39, 40. The inner bushing 117 is supported on the bearing bolt 39, 40 to be capable of axial movement but non-rotatably by means of a nut and spring 119. It is possible in this manner to more or less bias the rubber ring layer 120 of the bushing 16 made of vibration absorbing metal which is vulcanized onto the inner bushing 117 and its outer bushing 126.

Each one of the two hydraulic cylinders 15 is biased on two sides. It is possible by biasing the one or other side of the piston of the hydraulic cylinders, to pivot the cradle 11 and therewith the rinsing stand 12, 13, 14 fastened thereto through about 90°. The one end position of the rinsing apparatus is shown in FIG. 1 in solid lines, while the other end position is shown in this figure in dotted lines.

As has already been stated above, the box frame 10 and with it the hydraulic cylinder 15 and the carrier levers 41 mounted thereon may be displaced horizontally on the two floating pontoons 1 when looking in the longitudinal direction. By such a displacement it is possible on the one hand to regulate the center of gravity for the transport floating to the site where it is to be employed in such a manner that the entire apparatus is floating horizontally; on the other hand, it is also possible to favourably displace the static pitching moment in the pulling direction during the rinsing operation by a longitudinal displacement of the box frame 10, by pulling the frame 10 more to the rear from the center of gravity.

The displacement of the hook screws 33 already mentioned above (FIGS. 2–3) from one bearing place 37 to another is adapted to displace the box frame 10 and thus the cradle 11 together with the rinsing stand through the entire length of the floating members 1. The supply measuring and control lines which are to be described later which are leading from the ship employed in the laying operation to the rinsing apparatus, as well as the connections from the rigid portion of the apparatus to the displaceable one thereof are designed in such a manner that they may follow all the possible displacements.

The hydraulic pressure container 18 with the remote-controlled hydraulic pump 104 for the actuation of the hydraulic cylinder 15 built-in, is accommodated on the forward end of the two pontoons. The electrically driven servo oil pump 104 is connected with the hydraulic cylinders 15 through pressure lines or hoses 101, respectively (FIG. 4). The electric motor with the servo oil pump coupled thereto is started in correspondence with the required adjustment of depth of the rinsing apparatus from the towing ship in a clockwise or counterclockwise direction of rotation via the cable 85, so that the oil pressure generated actuates through the lines 101 the hydraulic cylinders 15 and may thus bring the cradle 11 and the rinsing stand flanged thereto into any desired position between 0 and 90°.

In the lower position of the pressure container, the servo oil balancing tank 103 is fitted which is connected with the servo pump through a suction and pressure balancing pipe 102. The balancing of the amounts of oil when operating the servo adjustment device is effected through an automatic regulator which is not shown here in any more detail.

There is also an electrically driven underwater high-pressure pump 20 supported in one or either of the pontoons (see FIGS. 1, 14, 15 and 17 and 18). This pump is supplied with current and controlled from the ship 80 via the cable line 85 (see FIG. 25). The pump 20 sucks water through a hose 21 in the form of an air funnel (FIG. 17). This hose which is provided with a funnel-like floating member 43 at its one end adjusts itself in dependence upon the depth of the water to such a level that the soil material whirled up by the rinsing nozzles cannot be sucked-in, too. The pressurized water is supplied in a loop to the pressure connection 44 of the pivotally supported cradle 11 via a hose 22. This cradle, now, combines in itself all the functions which are to be transferred to the rinsing stand, namely:

(1) The cradle is supported for rotatable movement in such a manner that the rinsing stand 12, 13, 14 may be rotated from the horizontal to the vertical position, (2) An underwater vibrator 17 is arranged on the cradle 11 in such a manner that the oscillations are not transmitted into the pontoons 1 but only onto the rinsing apparatus 12, 13, 14,

(3) The pressurized water line to the pressurized water connection 44 is guided in such a manner that the capability of rotation of the cradle is not impaired in any way. Thus, when replacing the types of rinsing apparatuses 12, 13, 14, one need only loosen the connecting flange between the cradle and the rinsing stand and screw anew the flanges after the insertion of another rinsing stand.

The formation of the rinsing stands is governed on the one hand by the object to be rinsed-in (cable or pipe), and on the other hand by the soil which is to be worked, this being the main factor governing the formation of the rinsing stands. Quite generally, the following are provided:

(a) The open construction of the rinsing apparatus 12 (see FIGS. 6–11, 19–22 and 25), (b) The closed construction of the rinsing stand 13 (see FIGS. 1–2, 4, 12, 13 and 23) and (c) The closed construction of the rinsing stand 14 for extremely hard soils (see FIG. 5).

As a rule, the open construction of the rinsing stand 12 offers special advantages as already set forth above. This rinsing stand 12 is shown in more detail in FIGS. 6–11.

FIG. 4 shows a rinsing stand 12 moving to the right while the rinsing stand 12 shown in FIG. 6 is moving to the left. The cable channel 32, in the case of this construction, is open forwardly as shown at 45 of FIG. 9 and is situated between two side jaws formed in an outward direction by two pressurized water channels 26. The two pressurized water channels are thus relatively flat and are disposed symmetrically with respect to the two sides of the cable channel 32. As will be seen from FIG. 6, the depth of the pressurized water channel is gradually decreasing from the entry opening 46 thereof to the closed end 47 thereof.

Toward the rear, the two inner walls of the pressurized water pipes 26 are combined by means of a semi-pipe 48 forming the rear portion or the line channel 32 in the upper part of the rinsing stand 12 and, in the lower part of the rinsing stand, the upper portion of the line channel. Thus, the cable is sliding along this semi-pipe 48 during the later rinsing operation. It enters from above at a point 49 and exits rearwardly from the U-shaped downwardly opening aperture 19. The two side jaws formed essentially by the pressurized water channels 26 and connected in the rearward region by means of the semi-pipe 48 thus constitute a downwardly opening elongated U-shaped profile opening forwardly in the top portion of the rinsing stand. In the top portion of the rinsing stand, another semi-pipe shell 127 is provided at the side of the semi-pipe 48, in order to increase here the strength of the rinsing stand, because here, very high forces may occur and the depth of the line channel is still small.

Rinsing nozzles 25 are arranged at the end faces of the two jaws formed by the pressurized water channels 26. They are directed upwardly at the front side of the pressurized water channels 26 as will be seen from FIG. 6, while the rinsing nozzles on the lower edge of the pressurized water channels are directed rearwardly. In addition, some of the rinsing nozzles 25 of the two pressurized water channels are displaced from one another in that the rinsing nozzles proper are directed inwardly, i.e. towards the line channel 32 (see FIG. 8).

The intermediate space at the end face between the two channels 26, that means the width of the line channel 32, is selected in correspondence with the diameter of the cable or pipe to be rinsed-in. It is thus possible to place the apparatus over a cable already laid and disposed on the soil below the water from above.

The pressurized water channels 26 may be equipped with baffles 56 which may under certain circumstances also extend a substantial length of the channel in such a manner that they subdivide the channel into several sections, one section supplying the one part of the nozzles and the other section supplying another part of the nozzles.

To the rear, the cable channel 32 and the semi-pipe extension 127 are provided with a substantially vertically extending fin 57 provided with relief openings 58. Also the side walls of the cable channel 32 are provided with passage openings 27 behind the pressurized water channels 26 through which the soil which may possibly have become upset, as well as stones, foreign matter etc. may exit. In this manner the exertion of exceedingly strong pressures on the cable or even damage to the cable are avoided.

As will be seen from FIGS. 9 and 10, the width of the cable channel 32 is at its minimum between the pressurized water channels 26 and increases in the rearward region or upper region, respectively. Under these circumstances, stones that might have entered or other material cannot jam but are exiting again through the passage openings 27 and are coming to rest on the cable or pipe that has been rinsed-in.

The side-walls of the line channel 32 are reinforced by means of longitudinally extending webs or fins 59 of an essentially triangular cross sectional configuration and are extending in the pulling direction i.e. essentially horizontally. They are extending from the rear edge of the pressurized water channels 26 as far as to the rear edge of the fin 57.

As already explained above, this rinsing stand 12 may be placed on the cable already laid out at the bottom of the ocean at any time from above. In addition, it may be lifted from the cable at any time during the rinsing operation by a crane or by blowing the flood cells in the floating members 1 and thus lifted by its own floating capacity.

The closed construction of the rinsing stand 13 (see FIGS. 12–13) is employed if difficult soil conditions are prevailing, i.e. when the use of an open rinsing stand is no longer possible because the cable would be endangered. With this apparatus it is also possible for the provision of a sharp nose and teeth 69 at the front side thereof, to overcome soil conditions which can no longer be coped with solely by the rinsing force of the nozzles. This apparatus is thus employed with hard soils such as shell layers, corals, decayed rocks, etc. With this apparatus, the vibrator 17 is employed (see FIGS. 1–2) which, on the one hand, has the sharp teeth 69 of the rinsing pipe work as a stone breaker, and, on the other hand, reduces the soil friction at the apparatus considerably. The vibrator may be set for this operation to an impact power of up to 28 tons in dependence upon the type of soil, with the amplitude of said vibrator also being governed by the type of the soil.

The closed rinsing stand construction consists of a stable box 31. The pressurized water channel 26' is enclosed from all sides by sections welded to one another. The subdivision of the pressurized water channel for the charging of the nozzles by groups makes it possible to supply the lowermost nozzles which are to deliver the greatest amount of water, first.

The line channel 32' disposed in the rear part of the rinsing stand is closed by channel flaps 68 which are screwed to the side wall sheet metal plates of the rinsing stand. The channel flaps 68 are detached when the cable is inserted at the beginning of the rinsing operation, and for the purpose of removing the cables on completion of the rinsing operation, so that the placing-in and taking-out, respectively, of the lines may be carried out without subjecting them to any tensional or bending stresses. Moreover, it is possible by displacement of the channel flaps 68 to reduce or enlarge the line channel in dependence upon the number of lines to be laid. The entry of the cable takes place just above the bottom of the ocean, there are thus hardly any forces required to lift the cable from the bottom of the ocean. Thus, owing to the construction of the rinsing stand, the cable lies fully protected within the reach of said rinsing stand. The rinsing pipe may have its forward sharp cutting edge provided with a cultivator-like nose 34 so that it may well be drawn into the soil, with said nose being additionally effective as a tearing tooth when a vibrator is employed. The nozzles 25' are arranged in recesses on both sides of the tearing tooth in such a manner that the water jet thereof effects an upwardly directed stream. Furthermore, this arrangement is effective that way that the soil in front of the nozzles cannot clog the nozzles even if the jolter is in operation.

With this rinsing stand of the FIGS. 12–13, three pressurized water channels 26' are provided altogether. That one of the pressurized water channels which is lying farthest to the left in FIG. 12, supplies the upper nozzles 25', while the second channel 26' which is disposed more to the rear supplies the lower nozzles. A suction channel 75 is also provided which is surrounded by another pressurized water channel which supplies the downwardly directed nozzles 76 and the nozzles 77. The nozzles 77 are terminating in the interior of the suction channel 75. The pressurized water jet exiting from them exerts a suctioning effect. Said rinsing stand is again flanged to the lower side of the cradle 11 by means of a flange 78. In FIG. 12, there are also towing ropes 55 indicated by means of which a direct pull may be exerted on the rinsing stand under certain circumstances. As indicated in FIG. 12, the line channel 78 is provided with dividers 150 to receive a line or several lines, especially cables or flexible pipes.

With types of soil having layers of spathic iron-ore, corals, limestone etc. extending therethrough, the rinsing stand 14 will be used (see FIG. 5). In order to be able to pass the oscillations of the vibrator 17 onto the deepest point of the apparatus more effectively, said vibrator is mounted on a steel structure 90 which is rigidly connected with the lower end of the pressurized water pipe 91 which is angularly bent rearwardly. The forward end face of the pipe 91 is again equipped with rinsing nozzles 25'' and with serrated teeth 30. The rinsing and serrated portion 91 which is mounted for rotation in the cradle 11, owing to this arrangement, is capable of dividing the soil more energetically; the nozzles 25'' convey the soil that has been torn loose upwardly and the pipe 91 sinks into the ground by its own weight considerably enhanced by the weight of the vibrator and the steel structure 90.

The bent cable channel 92 is resiliently suspended from the cradle and from within the steel structure 90 carrying the vibrator by means of spring 93; the cable to be load thus enters the ditch that has been milled and rinsed free of any oscillations from the apparatus.

This rinsing apparatus 14 has the upper portion thereof constructed in such a manner that it may be fastened to the lower flange of the cradle 11 in the same way as the two stand constructions 12, 13 described above. As has already been explained before, a television set 50 (see FIG. 19) with correspondingly strong spot lights is arranged on the carriage to observe the individual phases of the rinsing operation at the bottom of the ocean and in such a manner that it is possible to closely watch from aboard the ship employed in the laying operation all the functions of the apparatus. For further control, a list indicator 52 (see FIGS. 19–20) together with an indicator of inclination 53 is arranged in the center of the apparatus. It is therefore possible, in addition to the optical control, to read the list and the inclination of the carriage in the longitudinal direction from the indicating instrument aboard the ship. The respective position of the rinsing stands 12, 13, 14 relative to the horizontal plane of the carriage 1, 1 may be controlled via an angle-indicating instrument 54. The scale shows the position of the rinsing stand 12, 13 relative to the carriage by grades and the pertaining rinsing depth by meters.

All the electric cables (see FIG. 25) which are leading from the towing ship 80 to the rinsing carriage 1, are stranded to form a bundle of cables 85 provided with plastic floating members 94 at spaces in such a manner that the bundle of cables is relieved and thus a floating condition is obtained for better handling in the water.

A towing rope 81 (FIGS. 1, 2 and 3) engages at the inner edge of the bearings of the rolls 6 like a crow foot in such a manner that the cable to be rinsed in which lies free on the ground of the ocean may freely enter the rinsing apparatus between the two ropes. Numeral 82 in FIG. 3 designates a cable guiding hawse. It is arranged in the front region of the carrier 7 between the rolls 6 and serves the function of guiding the cable already laid on the ground of the ocean or uncoiling from a cable drum on a ship employed in the cable laying operation, respectively, in such a manner that it runs, on the one hand, clear of the rolls 6 and is introduced into the cable channel of the rinsing stand in a straight line.

The cable guiding hawse consists of a forward and rearward bead (in a manner not shown in more detail) both of them made of a pipe bend and welded to one another by baffles and sheet metal guides. In this manner, an extremely stable construction is achieved for the guidance of the cable. The lower part of the cable guiding hawse is rotatably suspended by means of a hinge in such a manner that it opens by its own weight after having been unlocked and drops the cable from out of it. The unlocking operation is effected via a remote control from the ship employed in the cable laying operation on completion of the rinsing operation when the carriage is to be removed from the line.

The two tubular beads arranged at the forward and rearward ends of the hawse are biased with pressurized water from the pressurized water system of the carriage equipment. From here, the pressurized water impinges on the cable being introduced through nozzle bores arranged in the tubular beads, in order to clean it from mud sticking thereto. Furthermore, the pressurized water exiting in front of the cable hawse provides for clear sight conditions for the region to receive the television camera 50 which is arranged immediately above the cable hawse.

With the carriage equipment as described above different types of laying operations may be carried out:

(1) Cables that have been laid already and are already in service may be rinsed to the depth as projected without any interruption in service, (2) When cables are newly laid, the cable may be rinsed-in directly from the cable tank of the ship employed in the laying operation or running from the drum.

Prior to carrying out each rinsing-in operation, an examination of the line is carried through with corresponding instruments (see FIG. 24).

For this purpose, a floating kite 61 is pulled over ground of the ocean by a towing ship spaced a short distance above the line while afloat over it. The floating depth of the kite 61 in the water is electrically adjusted by adjustable low rudders 70 at the wings 79 of the kite from the towing ship in correspondence with the water depth as measured by the echo sounder 74.

The floating kite 61 is equipped with a television camera 62 the reception range of which covers the angle 71. The underwater spot light 64 at the spot light arm 63 covers with its beams the range of the angle 73 of the bottom of the ocean which is to be photographed by the camera. A built-in echo sounder 75 serves to control the floating depth of the kite by means of its ultrasonic waves in the radiation and reception range 72.

The spars 66 fitted at the wings 79 constitute the points of introduction for the connection cables 67 which are suspended from the kite towing rope as a bundle. These connection cables form the electrical connection between the sight and control apparatuses on the towing ship and the instruments fitted in the kite and the depth controlling mechanism.

The floodlit bottom is scanned by the camera and appears on the image panel in the observatory central of the ship employed in the laying operation. The pictures noted from the bottom are continuously drawn on the map showing the line in accordance with their nature. At the same time, the reflected impulses of the echo sounder which are more or less penetrating the bottom in dependence upon the nature of the bottom, are reflected and passed into a writing equipment via receivers and amplifiers, and constantly recorded. The lines drawn on the strip allow conclusions on the nature of the bottom by weaker or stronger tones of said lines. So, for instance weak mud shows slightly grey, sand a medium grey, clay shows dark grey, and stones and rocks show black. Difficult regions which are still obscure after the above measures have been carried out, may be exactly examined once more locally and it is possible, in case of necessity, to draw samples of the soil by means of a special probe.

The forward movement of the carriage is effected in accordance with various methods and is governed by the local conditions such as, for instance, depth of water, current, tidal range etc.

(1) *Phase—Bank region*

The carriage equipment with the rinsing stand, for instance, 13 (see FIG. 23), readily mounted at the cradle 11, is assembled at the bank and the cable is placed into the horizontally disposed rinsing tube. When the cable has been fitted, the carriage equipment is pulled into deeper water under the influence of the rinsing effect and with the rinsing stand 13 assuming at the same time its upright position, this operation being effected from the ship employed in the laying operation which has been fixed by anchor in its position more or less remote from the bank in dependance upon local conditions. Until the water line is reached, the pressurized water is supplied from the ship employed in the laying operation; thereupon the underwater pump 20 is employed when a sufficient depth of water has been reached. The hose connection to the ship employed in the laying operation is then removed. The necessary amount of loose cable is kept in readiness by the ship employed in the laying operation. The hydraulic cylinders 15 enable a gradual and very safe erection of the rinsing stand 13 up to the desired rinsing depth 96.

(2) *Phase—Rinsing near the shore*

The extension of the cable which has been laid out is marked by buoys before starting the laying operation during the examination of the line. As long as the depth of the water (30–60 m.) is still sufficient to allow for an anchoring of the ship, the ship will intermittently anchor anew some kilometers beyond the cable that has already been laid and will then pull the carriage equipment running along the cable close to its position by means of a pulling wire and using the force of a winch.

(3) *Phase—Rinsing-in in considerable depths of water*

When reaching depths of water in which a stationary anchoring of the ship employed in the laying operation is no longer possible, pulling of the carriage equipment is effected by means of a trawler 80 (see FIG. 25) which is employed in front of the carriage 1 with respect to the pulling direction and with the use of a correspondingly long pulling wire 81.

The energy generators 83, i.e. especially the electrical generators, will then be installed on the trawler, and all the functions of the apparatus will now be watched from the observation and controlling central station 84.

The bundle of control and supply cables 85 now establishes the connection between the controlling central station on the trawler and the apparatus on the bottom of the ocean. The cable lengh is coiled on, or uncoiled from, the cable storing drum (not shown in more detail) in correspondence with the respective depth of the water; all the functions of the rinsing-in carriage will now be watched and controlled from the central observatory 84 on the trawler 80. The own weight of the bundle of cables 85 is balanced for load relief by the carrier buoys 94 secured at corresponding spaces by means of spring safety hooks. The cable 95 to be rinsed-in runs through a great roller bend 87 which is suspended from the stern of the trawler in a manner to be adjustable in depth, to the carriage equipment 1, 12 running therebehind on the bottom of the ocean. An underwater television camera 88 is fitted in this roller bend with its pertaining spot lights by means of which the nature of the soil is controlled; possible damages of the cable may be found and in addition the passage of the cable reinforcements 89 may be watched.

If the laying operation has reached greater depths of water where it is to be completed, the available amount of loose cable is disposed laterally from the trawler in a great bay on the bottom of the ocean. The cable rolls may be loosened automatically so that the bend of rolls 87 may be hauled back aboard the trawler.

As in this case when an open rinsing stand 12 is employed, one may either have the floatable member 1 rise to become afloat by emptying the cells of the floatable members 1 by bleeding them with compressed air, or fetch it to the surface of the water via the pulling wire 81 by means of the charging equipment which is located aboard the trawler.

Also with this process the rinse-in depth will positively have to be governed by the soil conditions encountered. In the case of sandy soils, a rinse-in depth of 3–4 m. will be possible while in the case of harder soils only a lower rinse-in depth is still obtainable. At any rate, it is possible also with harder soils, to embed the cable deeper than is possible with trawling anchors and similar apparatuses.

In case the soil should become so hard in the direction in which the laying is carried out that the own weight of the rinsing stand and that of the carriage are no longer sufficient for the rinsing stand to reach the full depth, then the entire laying apparatus is lifted at the rear end.

The position of the apparatus is indicated to the central observatory via the built-in television set and the inclination measuring instrument. Now, the rinsing depth is reduced in correspondence with the density of the soil, making use of the remote operating facility of the hydraulic adjusting device 15 for the rinsing stand 12, 13, to such an extent that the possible maximum rinsing depth is guaranteed. After the distance of hard soil has been traversed, the original rinsing depth may again be restored.

By this invention it is guaranteed that the maximum rinsing depth is obtained in dependence upon the nature of the soil.

The above mentioned phases are only described as a system, for the laying operation may also be otherwise influenced in dependence upon the local conditions such as nature of the soil, tides, currents, depths of water, so that deviations and supplements of the process are described may result therefrom.

In case the invention is practiced with the flush-bedding stand of FIGS. 6–11, the cable or the like to be laid is supplied below the transverse beam of the cradle which is essentially formed by the upper web 112 or the lower web 113 (see FIGS. 26–29). The connection 44 for the pressurized fluid thus in this case is disposed behind the cable or the like to be laid looking in the direction of movement.

If, however, the invention is practiced with the aid of the other flush-bedding stands which are described hereinbefore, the cable or the like to be laid is supplied above said transverse beam formed by the webs 112 and 113 of the cradle. The cable or the like to be laid then extends between said transverse beam formed by the webs 112 and 113 and the anchoring bolt 76 or the oscillator 17, respectively, fastened on the upper side of the cradle. Therefore, in this case, the cable or the like to be laid is disposed in the rear of the connection 44 for the pressurized fluid when looking in the direction of movement.

I claim:

1. In an arrangement to flush-bed flexible lines, especially plastic pipes, electric cables or the like underground at the bottom of waters, a sled member adapted to be moved along the water bottom in a flush-bedding direction, a cradle member, means rotatably supporting said cradle member on said sled member, power means adapted to rotate said cradle member on said sled member from a first position to a second position and adapted to selectively hold said cradle member in said first or said second position or in any intermediate position therebetween, a flush-bedding stand having longitudinally extending first and second channel structures each having an inlet defined therein, means detachably connecting said cradle member to said flush-bedding stand adjacent said inlet openings, said flush-bedding stand projecting downward from the underside of said sled member when said cradle member is in said first position and extending above said sled underside when said cradle member is in said second position, means feeding a pressurized fluid to said inlet of said first channel structure, a plurality of outlet nozzles defined in said stand in communication with said first channel structure and at least partially directed toward said flush-bedding direction when said cradle member is in said first position, means feeding at least one flexible line to said inlet of said second channel structure, and an outlet defined in said stand second channel structure at the end opposite said inlet of said second channel structure and extending in the direction opposite said flush-bedding direction when said cradle member is in said first position.

2. An arrangement as claimed in claim 1, a roll assembly mounted on said sled member and extending therefrom in said flush-bedding direction, said roll assembly comprising a longitudinally extending support connected to said sled member and projecting in said flush-bedding direction, and at least one roll rotatably mounted an said support in spaced relationship with respect to said sled member.

3. In an arrangement as claimed in claim 2, means defined on said sled member adjusting the spaced relationship of said roll with respect to said sled member.

4. An arrangement as claimed in claim 1 in which said sled member comprises two longitudinally extending hollow bodies, means detachably connecting said bodies one with another, and means adapted to selectively control the amount of water within said hollow bodies.

5. An arrangement as claimed in claim 4 in which a plurality of wall members are defined in said bodies subdividing said hollow bodies into a plurality of compartments.

6. An arrangement as claimed in claim 1, said power means including two hydraulic servo-motors, means connecting the movable parts of said servo-motors to said sled member and said cradle member respectively, a pump actuating said hydraulic servo-motors, an electric motor driving said pump, and a fluid-tight container mounted on said sled member housing said pump and said electric motor.

7. An arrangement as claimed in claim 1, a platform frame, means selectively detachably fastening said platform frame on said sled member in a plurality of positions, and means rotatably supporting said cradle member on said platform frame.

8. An arrangement as claimed in claim 1, a mechanical vibrator, a pillar member mounting said vibrator on said flush-bedding stand, said vibrator being located above the underside of said sled member when said cradle is in said first position.

9. In an arrangement to flush-bed flexible lines, especially plastic pipes, electric cables or the like underground at the bottom of waters, a sled member adapted to be moved along the water bottom in a flush-bedding direction, a cradle member, two spaced lever members rotatably mounted upon a substantially horizontal axis on said sled member, said axis being substantially perpendicular to said flush-bedding direction, means detachably connecting said cradle member to said two lever members, power means rotating said two lever members from a first position to a second position and adapted to selectively hold said cradle member in said first or said second position or in any intermediate position therebetween, a flush-bedding stand having longitudinally extending first and second channel structures defined therein each having an inlet, means detachably connecting said cradle member to said flush-bedding stand adjacent said inlets, said flush-bedding stand projecting downward from the underside of said sled member when said cradle member is in said first position and extending above said underside when said cradle member is in said second position, means feeding a pressurized fluid to said inlet of said first channel structure, a plurality of outlet nozzles defined in said stand in communication with said first channel structure and at least partially directed toward said flush-bedding direction when said cradle member is in said first position, means feeding at least one flexible line to said inlet of said second channel structure, and an outlet defined in said stand second channel structure at the end opposite said inlet of said second channel structure and extending in the direction opposite to said flush-bedding direction when said cradle member is in said first position.

10. An arrangement as claimed in claim 9 having in combination detachable means for connecting said spaced lever members to each other.

11. An arrangement as claimed in claim 10, in which said detachable means comprises a longitudinally extending strut member, and means for clamping the ends of said strut member to said spaced lever members.

12. An arrangement as claimed in claim 10, in which said detachable means comprises a strut member longitudinally extending through an open assembly defined on the upper side of said cradle member, and means fastening the ends of said strut member to said spaced lever members.

13. A cradle member for rotatably supporting a flush-bedding assembly on a sledge-like member having a combination, two spaced side frames extending in parallel relationship one with respect to another, one transverse frame connecting said two side frames one with another, two spaced bearing post members arranged on both sides of said both side frames and projecting outwards from said side frames, said transverse frame including a pressure-tight chamber having an inlet aperture and an outlet aperture, a first flange structure having a parallel extension with respect to the axis of said bearing post members and lying outside the space between said bearing post members, said first flange structure being formed by said side frame members, a second flange structure being parallel and spaced to said first flange structure and being formed by said side frame members and said transverse frame member, and means for fluid-tightly encompassing said outlet aperture by said second flange structure.

14. A cradle member as claimed in claim 13, having additionally a detachable strut element near said first flange structure for stiffening said side frame members one with respect to another.

15. In an arrangement to flush-bed flexible lines, especially plastic pipes, electric cables or the like underground at the bottom of waters, a sled member adapted to be moved along the water bottom in a flush-bedding direction, a flush-bedding assembly comprising a cradle member and a flush-bedding stand, a vibrator for generating mecahnical vibrations connected to said flush-bedding assembly, means rotatably supporting said cradle member on said sled member including means absorbing mechanical vibrations, power means rotating said cradle member on said sled member from a first position to a second position and adapted to selectively hold said cradle member in said first or said second position or in any intermediate position therebetween, a flush-bedding stand having longitudinally extending first and second channel structures each having an inlet defined therein, means detachably connecting said cradle member to said flush-bedding stand adjacent said inlet openings, said flush-bedding stand projecting downward from the underside of said sled member when said cradle member is in said first position and extending above said sled underside when said cradle member is in said second position, means feeding a pressurized fluid to said inlet of said first channel structure, a plurality of outlet nozzles defined in said stand in communication with said first channel structure and at least partially directed toward said flush-bedding direction when said cradle member is in said first position, means feeding at least one flexible line to said inlet of said second channel structure, and an outlet defined in said stand second channel structure at the end opposite said inlet of said second channel structure and extending in the direction opposite said flush-bedding direction when said cradle member is in said first position.

16. In an arrangement to flush-bed flexible lines, especially plastic pipes, electric cables or the like underground at the bottom of the waters, a sled member adapted to be moved along the water bottom in a flush-bedding direction, a cradle member, a vibrator for generating mechanical vibrations connected to said cradle member, means rotatably supporting said cradle member on said sled member including means absorbing mechanical vibrations, power means rotating said cradle member on said sled member from a first position to a second position and adapted to selectively hold said cradle member in said first or said second position or in any intermediate position therebetween, a flush-bedding stand having longitudinally extending first and second channel structures each having an inlet defined therein, means detachably connecting said cradle member to said flush-bedding stand adjacent said inlet openings, said flush-bedding stand projecting downward from the underside of said sled member when said cradle member is in said first position and extending above said sled underside when said cradle member is in said second position, means feeding a pressurized fluid to said inlet of said first channel structure, a plurality of outlet nozzles defined in said stand in communication with said first channel structure and at least partially directed toward said flush-bedding direction when said cradle member is in said first position, means feeding at least one flexible line to said inlet of said second channel structure, and an outlet defined in said stand second channel structure at the end opposite said inlet of said second channel structure and extending in the direction opposite said flush-bedding direction when said cradle member is in said first position.

References Cited

UNITED STATES PATENTS

| | | | |
|---|---|---|---|
| 1,854,617 | 4/1932 | Maloon | 61—72.6 |
| 2,663,515 | 12/1953 | Kinsinger | 61—72.6 X |
| 2,992,537 | 7/1961 | Callaham | 61—72.4 |
| 3,171,219 | 3/1965 | Kaufmann et al. | 61—72.4 X |
| 3,222,876 | 12/1965 | Harmstorf | 61—72.4 |

FOREIGN PATENTS

| | | |
|---|---|---|
| 900,959 | 1/1954 | Germany. |
| 762,634 | 11/1956 | Great Britain. |

OTHER REFERENCES

Germany printed patent application KL 21c 19/10, 7–1961.

EARL J. WITMER, *Primary Examiner.*